United States Patent [19]
Burgdorf et al.

[11] Patent Number: 5,209,553
[45] Date of Patent: May 11, 1993

[54] ANTI-LOCKING HYDRAULIC BRAKE SYSTEM

[75] Inventors: Jochen Burgdorf, Offenbach-Rumpenheim; Anton David, Stuttgart; Georg Obersteiner, Koenigstein; Hans-Albrecht Guse, Homburg; Ulrich Zutt, Niedernhausen; Bernd Schweighoefer, Schmitten, all of Fed. Rep. of Germany

[73] Assignee: Alfred Teves GmbH, Frankfurt am Main, Fed. Rep. of Germany

[21] Appl. No.: 613,797

[22] PCT Filed: Jan. 24, 1990

[86] PCT No.: PCT/EP90/00131
§ 371 Date: Nov. 13, 1990
§ 102(e) Date: Nov. 13, 1990

[87] PCT Pub. No.: WO90/11212
PCT Pub. Date: Oct. 4, 1990

[30] Foreign Application Priority Data
Mar. 21, 1989 [DE] Fed. Rep. of Germany ....... 3909209
Apr. 20, 1989 [DE] Fed. Rep. of Germany ....... 3912935

[51] Int. Cl.$^5$ .............................................. B60T 13/14
[52] U.S. Cl. ................................. 303/116.1; 303/87; 303/116.4
[58] Field of Search ............... 303/87, 10, 11, 113 R, 303/116 SP, 116 PC, 115 R, DIG. 5, DIG. 6, 116 R

[56] References Cited

U.S. PATENT DOCUMENTS

| | | | |
|---|---|---|---|
| 2,755,820 | 7/1956 | Taylor | 138/26 |
| 2,808,070 | 10/1957 | Malsbary | 138/26 |
| 2,899,975 | 8/1959 | Fernandez | 137/543.17 |
| 4,952,002 | 8/1990 | Arikawa et al. | 303/116 SP |
| 5,004,301 | 4/1991 | Yamada et al. | 303/115 PP |
| 5,058,961 | 10/1991 | Mergenthaler et al. | 303/87 X |
| 5,066,075 | 11/1991 | Kaneda et al. | 303/113 R |

FOREIGN PATENT DOCUMENTS

| | | | |
|---|---|---|---|
| 0264855 | 4/1988 | European Pat. Off. | |
| 0282031 | 9/1988 | European Pat. Off. | |
| 407721 | 1/1991 | European Pat. Off. | 303/DIG. 5 |
| 2128168 | 6/1971 | Fed. Rep. of Germany | |
| 3137287 | 1/1984 | Fed. Rep. of Germany | |
| 3808901 | 10/1989 | Fed. Rep. of Germany | |
| 160751 | 10/1982 | Japan | 303/116 R |
| 2165003 | 4/1986 | United Kingdom | |
| 2193770 | 2/1988 | United Kingdom | |
| 2194010 | 2/1988 | United Kingdom | |
| 2196401 | 4/1988 | United Kingdom | |

*Primary Examiner*—Robert J. Oberleitner
*Assistant Examiner*—Alfred Muratori
*Attorney, Agent, or Firm*—Robert P. Seitter; J. Gordon Lewis

[57] ABSTRACT

An anti-locking hydraulic brake system is described which includes a pump, the output of which flows through a pressure valve (20), a damping chamber (24), a check valve (28) and a throttle (31) and is delivered to a pressure connection in communication with the wheel brake conduit. To ensure, in a compact structural design, a noise-minimizing hydraulic pressure source, while avoiding a flow back of pressure fluid from the brake system into the damping device, a check valve (28) is integrated into the damping device. A pressure valve is integrated with the check valve and damping chamber, with an elastomeric elastic member disposed in the damping chamber to absorb pressure pulsations.

22 Claims, 2 Drawing Sheets

ANTI-LOCKING HYDRAULIC BRAKE SYSTEM

BACKGROUND OF THE INVENTION

The present invention relates to an anti-locking hydraulic brake system of the type comprising a master brake cylinder and wheel brakes in communication therewith. A pump including a damping chamber, a check valve and a throttle delivers pressure to the brake circuit. The check valve is integrated into the damping device.

A system of this type is described, for example, in German patent document DE-OS 31 37 287. During actuation of the brake of this system, pressure fluid is forced from the master brake cylinder into the wheel brake such that the brake pads come into abutment with the brake shoes and with the brake disc, respectively, thereby causing a brake effect to be generated. Once the brake force rises beyond a predetermined level, the wheel may tend to lock. Upon occurrence of that condition, the brake conduit is blocked and pressure fluid is discharged from the wheel brake. By means of a pump, the pressure fluid is fed back into the master brake cylinder. As soon as the wheel becomes adequately reaccelerated, the brake conduit is re-opened to resupply pressure to the wheel brake for building up brake pressure.

To attain the described switch conditions, modulation valves are provided in the brake conduit and in the relief conduit. During blocking and opening of the brake conduit and of the relief conduit, respectively, pressure waves created in the hydraulic system are unavoidable. Such waves generate physical sonic vibrations which reach a substantial intensity and cause an unpleasant sensation to the driver of the automotive vehicle. Moreover, the noises can be interpreted as errors in the brake system with the danger that the driver may be caused to take unforeseeable corrective measures. According to the noted German patent, it is, therefore, suggested that a damping means and a throttle restriction means be provided in the pressure conduit between the pump and the master brake cylinder, and the termination of the pressure conduit into the brake conduit, respectively. Such measures smooth the undesirable pressure waves, thereby virtually ensuring a reduction in the noise which otherwise would result.

However, the above described system involves a particularly notable disadvantage. As the damping and throttle restriction means are coupled to the brake conduits, they also will become active during a non-controlled deceleration process. During such a deceleration process, the pressure fluid forced from the master brake cylinder to the wheel brakes not only is received by the wheel brake cylinder but also is received by the damping means, with the result that the pedal travel is extended.

It is, therefore, an object of the present invention to provide an anti-locking hydraulic brake system which, during the control phase, operates at a low pressure pulsation and at a minimized noise level and, during a non-controlled deceleration, avoids any unnecessary extension of the pedal travel.

According to another object, the brake system is to provide an inexpensive and compact construction requiring minimal assembling efforts. This problem is solved by the characterizing features of the present invention as set forth below.

SUMMARY OF THE INVENTION

The system according to the present invention can be employed with anti-locking hydraulic brake systems of varying types. It can be used, for example, with brake systems of the type as described in the noted German patent, wherein the intake side of the pump is exclusively coupled to the relief conduit. Conversely, it also can be employed if the pump is connected, as in the subsequently described embodiment, to a reservoir which, with the pump non-actuated, is in communication with the working chambers of the master brake cylinder.

The solution in accordance with the present invention provides a substantial pre-assembly of the brake system so that the final assembly into the automotive vehicle involves only minor assembling efforts. Also, inspection of the damping means or the entire brake system, is improved in accordance with the present invention. Still other measures of the present invention provide a particularly compact and integrated formation of the energy supply system.

An especially effective minimization of pressure pulsations and, hence, of noises, is attained wherein the damping chamber, at least in part, is confined by an elastomeric molded part, the side of which facing away from the damping chamber defines at least one cavity. Due to this measure it is possible through simple and compact means, to damp pressure pulsations even at a high pressure level. Pressure peaks are reduced in that the elastomeric molded part accommodates form-changing energy by deflecting into the cavity. The damping characteristic may be influenced by providing a spring element through which pressure can be applied to the elastomeric molded part. These measure also will reduce heating.

BRIEF DESCRIPTION OF THE DRAWING

Further advantageous features as well as the function of the invention will become manifest from the following detailed description with reference to the accompanying drawing, wherein.

DETAILED DESCRIPTION

Figure 1:
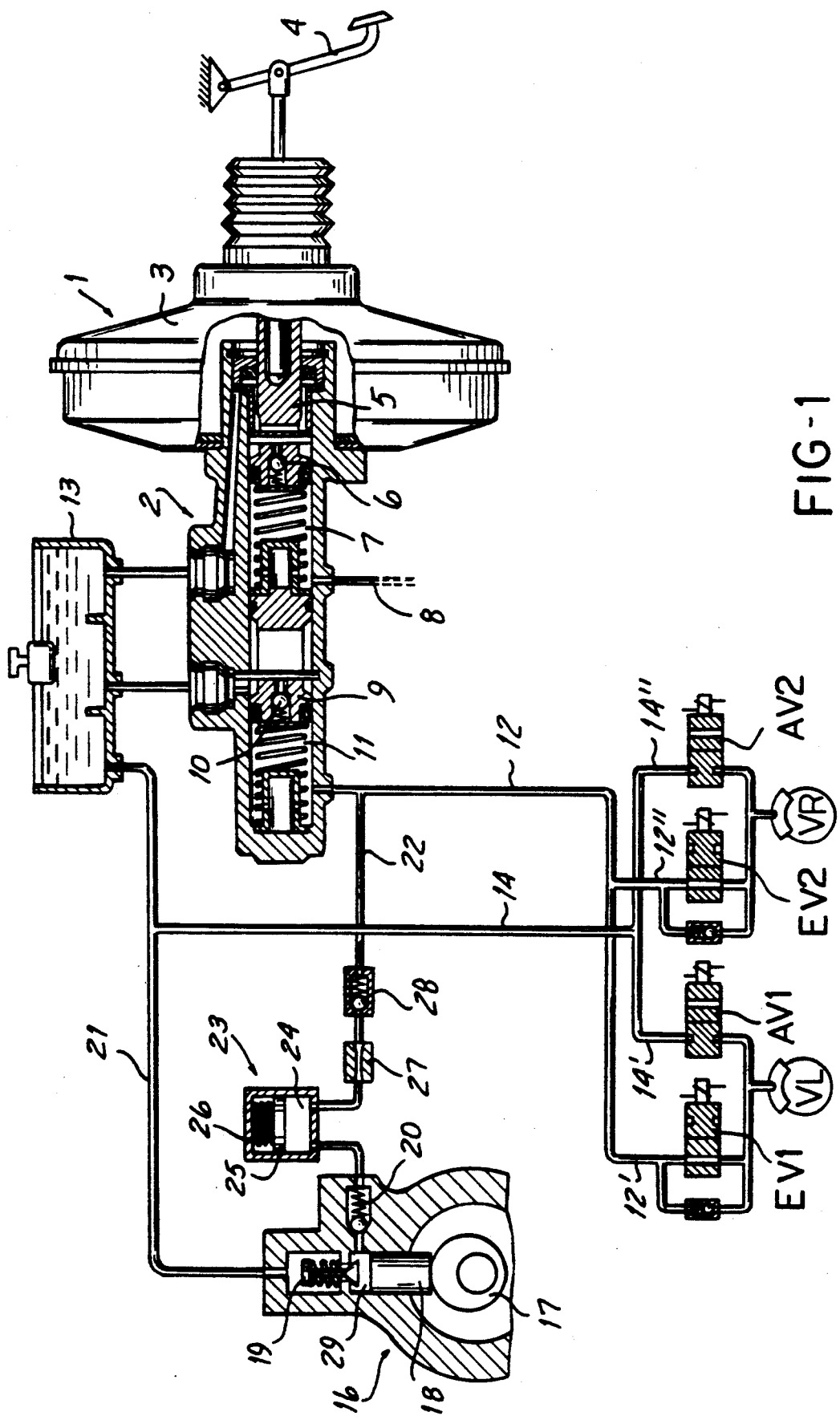
FIG. 1 schematically, shows the brake system in accordance with the present invention.

FIG. 1 of the drawing schematically shows a brake system comprising a brake pressure generator 1 which, in turn, consists of a master brake cylinder 2 and a vacuum booster 3. For actuating the system, a force is applied to pedal 4. The force, which is enhanced by the auxiliary force of the vacuum booster 3, is transmitted to the push rod piston 5 of the master brake cylinder 2. Under the action exerted by the force, the push rod piston 5 is displaced, thereby causing the central valve 6 to close. In the working chamber 7, a pressure is built up which is transmitted to the floating piston 9 which, under the action of the pressure, is displaced, thereby causing the central valve 10 to close and a pressure also to build up in the working chamber 11.

Connected to the working chambers 7 and 11 are brake conduits 8 and 12, with the brake conduit 12 according to this embodiment coupled to the front wheels of the automotive vehicle. For that purpose, the brake conduit 12 is subdivided into two branch conduits 12', 12" connected to which respectively are one individual wheel of the front axle. Provided in the branch conduits 12', 12", is one check valve EV1 and EV2, respectively, open in die-energized condition.

The wheel brakes, moreover, are in communication with the reservoir 13 through a relief conduit 14, in the branch conduits 14', 14", in each of which is respectively provided one outlet valve AV1 and AV2 each of which are closed in the de-energized condition. The reservoir 13 is in communication with the intake side of the pump 16 through the intake conduit 21. The pressure side of the pump, through a pressure conduit 22, leads into the brake conduit 12. The brake circuit of the brake conduit 8 is not shown in the drawing. The rear wheel are connected to the brake conduit 8 in the same manner as are the front wheels to the brake conduit 12.

The pump includes an eccentric 17 actuating a pump piston 18, with the latter confining a pump chamber 29 which, through a suction valve 19, is in communication with the intake conduit 21 and, through a pressure valve 20, is in communication with the pressure conduit 22. The suction valve 19 and the pressure valve 20, respectively, are check valves. Connected to the pressure valve 20 is a damping chamber 24 illustrated in the pressure conduit 22. The damping chamber 24 is confined by a piston 25 to which pressure is applied by a spring 26. The spring 26 is so supported on the piston 25 that it is forced into the damping chamber 24, thereby occupying its minimum volume. Coupled to the damping means 23 is a throttle restriction 27. Connected to the throttle restriction 27 is a check valve 28 inserted into the pressure conduit 22 for blocking toward the pump.

FIG. 1 shows the brake in a non-actuated position. The working chambers 7 and 11, through the open central valves 10 and 6, are in communication with the reservoir 13. By actuating the pedal 4, pressure is built up in the working chambers in the manner as described, which pressure, through the brake conduit 12, is passed to the wheels of the front axle. The pressure in the brake conduits and, hence, in the wheel brakes, is determined by the pedal force.

During the deceleration process, the wheel rotating pattern of the brakes is permanently monitored by means of sensors so that the tendency of the wheels to lock is detected without delay. In that case, corresponding switch signals are provided to the valves EV1, AV1, EV2, AV2. The first control step is that the inlet valve EV1 and EV2, respectively, of the wheel tending to lock is closed, thereby precluding any additional pressure built-up in the wheel brake in communication therewith. For decreasing the pressure, the outlet valve AV1 and AV2, respectively, is opened, thereby causing pressure fluid to be discharged from the wheel brake and to be passed into the reservoir 13. At the same time, the pump drive is actuated. The pump discharges the pressure fluid from the pressure fluid reservoir 13 to deliver the pressure to the brake conduit 12.

Once the wheel tending to lock has been adequately reaccelerated, the outlet valve is closed and the inlet valve opened so that pressure fluid can again be passed to the wheel brakes to build up a brake pressure. The control results in repeated cycles of pressure increase and decrease, respectively wherein the wheel can be adjusted in a predetermined slip range, thereby transferring maximum brake forces while simultaneously enabling the automotive vehicle to be steered.

The damping means is inserted into the pressure conduits 22, which is especially effective when the pump, with the inlet valves EV1, EV2 closed, delivers its output to the brake conduits. As the brake conduit is closed, the pressure pulsations of the pump would be experienced in the brake conduit section between the inlet valve and the master brake cylinder, releasing the corresponding physical sonic waves. This is eliminated by damping means in cooperation with the throttle restriction. The pressure fluid flowing from the pump dams up on the throttle restriction 27, reaching the damping chamber 24 of the damping means 23, thereby displacing the piston 25 against the force of spring 26, thereby smoothing, in a known manner, the pressure waves, with the result that the noise development is dramatically reduced. The check valve 28 then assumes the important function of precluding, in a non-controlled deceleration, pressure fluid from the master brake cylinder into the damping chamber 24. This is because due to the pressure developing in the brake circuit 12, the check valve 18 is closed so that the damping chamber 24 does not become active.

Figure 2:
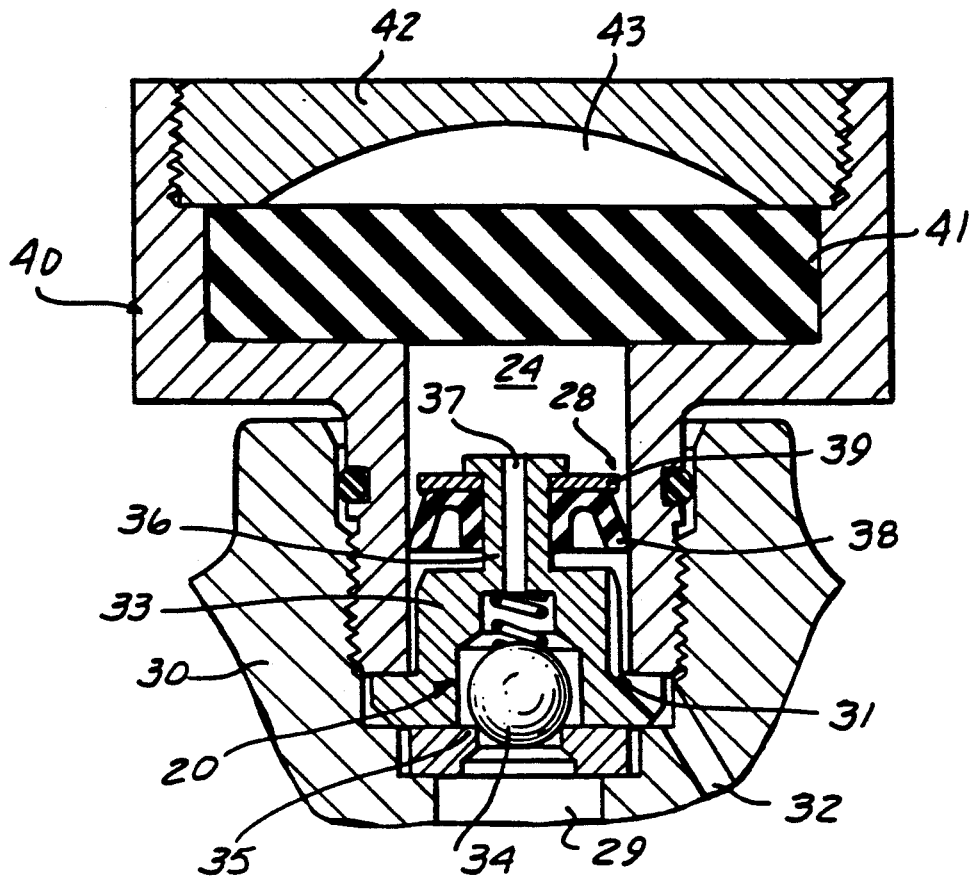
FIG. 2 is an enlarged sectional view of a first embodiment of the damping means; and, FIG. 3 is an elongated sectional view of a first embodiment of the damping means in accordance with the present invention.

FIG. 2 illustrates a part of the radial piston pump comprising a cylinder block 30 wherein, through a working piston (not shown) pressure fluid is delivered from a pump chamber 29, through the pressure valve 20, into a damping chamber 24. The pressure then flows, through the check valve 28 and the throttle restriction 31, to the pressure connection 32 in communication with a pressure conduit (not shown). The latter, in turn, is in communication with the brake conduit between the master cylinder (not shown) and the wheel brakes (not shown).

The pressure valve 20 comprises a valve housing 33 and a spring-loaded valve closure member placed in abutment with the valve seat 35. The valve seat 35 also serves as a seal between the valve housing 33 and the pump chamber 29. Fixed to the valve housing 33 is a valve support 36 including an axially extending passageway 37 hydraulically connecting the pressure valve 20 to the damping chamber 24. The valve support 36 is radially surrounded by the overflow collar 38 forming together with the valve support and the confining wall of the damping chamber in abutment with the sealing lip of the overflow collar 38, the check valve 28 aligned on the valve housing 33 with the pressure valve 20. The overflow collar 38 is axially locked by the support disc 39 supporting itself on a radial extension of the valve support 36. The damping chamber 24 is substantially confined by the closure member 40 threaded into the cylindrical block 30 and securing the valve housing 33. An axially confining wall of the damping chamber 24 is formed by the elastomeric slab part 41 held by the cover 42 against a bearing face of the closure member 40. The cover 42 includes a recess through which the cavity 43 is formed on the side of the elastomeric molded part 41 disposed opposite the damping chamber.

In the event of strong pressure peaks, the elastomeric molded part 41, in accordance with its form-changing capability and the rigidity thereof, can deflect, in response to the pressure, into the cavity 43, thereby smoothing the pressure pulsations. As the pressure pulsations take place at a high pressure level, the molded part 41 exhibits a relatively low compressibility such that the energy absorption substantially is provided through resilient deformation.

An additional damping effect is attained through inversion of the direction of flow between the pump chamber and the pressure connection 32. It is of special advantage according to the embodiment of FIG. 1, that the in-flow into the damping chamber 24 is through the passageway 37, that is, through a closed cross-section, while the out-flow from the damping chamber 24 is through an annular gap between the valve housing and the inside of the bore in the closure member 40 receiving the valve housing 33.

Figure 3:
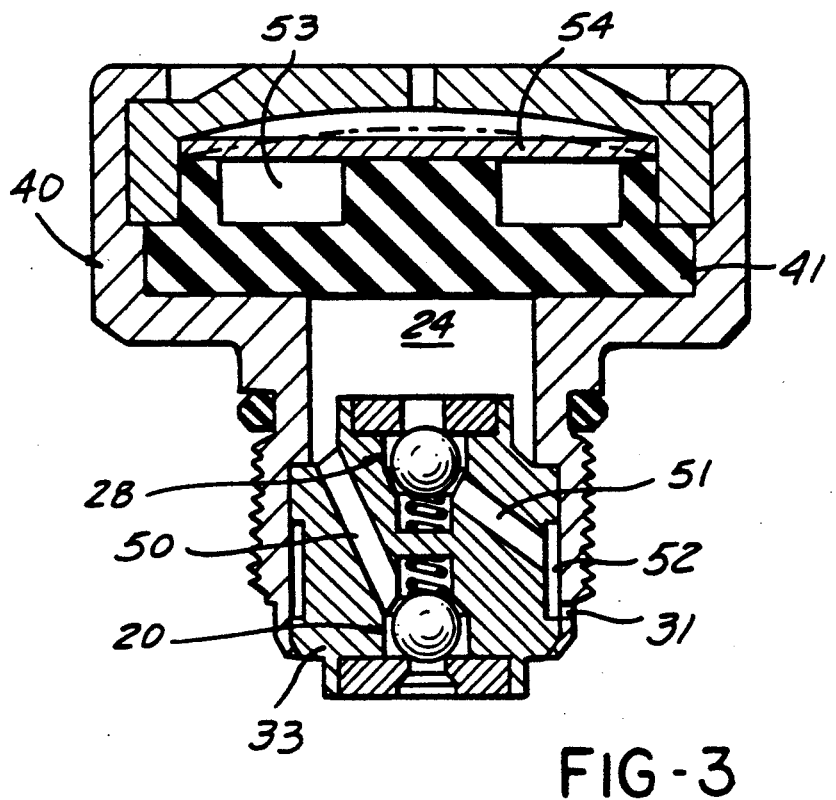

FIG. 3 illustrates an embodiment wherein both the pressure valve 20 and the check valve 28 are formed as aligned spring-loaded check valves comprising a spherical valve closure member within a valve housing 33. The pressure valve 20 associated with the pump chamber, through passageway 50, is in communication with the damping chamber 24 from when the pressure fluid, through the check valve 28, the passageway 51, and annular chamber 52 and the throttle 31, is passed to the pressure connection (not shown).

Preferably, the valve housing 33 is fixed into the closure member 40 by forming over the material of the valve housing as shown, and is then, in a completely pre-assembled condition, screwed into the cylindrical block. The elastomeric molded part 41 is held by a cover also fixed to the closure member 40 by forming the edge over the cover, and is provided with recesses 53 for elastic deformation of portions of the molded part 41. Disposed between the elastomeric molded portion 41 and the cover is a spring element 54 which is of a disc-type configuration. By the elastic application of force to the molded part 41, it is possible to attain an optimum adjustment of the damping characteristic, especially a linear damping. Also, an adjustment of the damping means to the respective pressure level of the pump is attainable thereby.

What is claimed is:

1. An anti-locking hydraulic brake system comprising:
   a brake pedal; a master cylinder having a working chamber adapted to be pressurized by actuation of said brake pedal; at least one wheel brake; a rake conduit; said wheel brake in communication with said master brake cylinder through said brake conduit; a pump having an inlet and an outlet; and a pump chamber; a pressure conduit communicating said pump outlet with said master brake cylinder; a fluid reservoir in communication with said master cylinder working chamber with said brake pedal non actuated; a relief conduit communicating said wheel brake with said fluid reservoir, said pump inlet communicating with said relief conduit; modulation valves for the control of the pressure in said wheel brake, including an outlet valve means in said relief conduit causing pressure fluid to be discharged from said wheel brake for a pressure decrease, and including an inlet valve means in said brake conduit causing pressure fluid to be supplied to said wheel brake for a pressure increase; a throttle restriction provided in said pressure;
   damping means including a damping chamber having a wall; a check valve combined with said damping means and interposed before said master cylinder blocking flow back towards said pump; said check valve formed by an overflow collar having a sealing lip, said sealing lip in abutment with said wall of said damping chamber;
   said pump a piston-type pump including a piston actuated by an eccentric, with a suction valve being provided in communication with said inlet and a pressure valve provided in communication with said outlet and located between said damping means and said pump chamber;
   said check valve and pressure valve combined in a single assembly together with said damping means.

2. A hydraulic brake system according to claim 1, wherein said damping means and said throttle restriction are connected in series.

3. A hydraulic brake system according to claim 2, wherein said throttle restriction is located between said damping means and said master brake cylinder.

4. A hydraulic brake system according to claim 1, wherein said damping chamber is defined in part by a member displaceable against a spring force to enlarge the volume of said damping chamber.

5. A brake system according to claim 4, wherein said damping means comprises a cylinder in which is sealingly guided a piston, and further comprises a spring applying pressure to said piston tending to a reduce the volume of the damping chamber.

6. A brake system according to claim 1, further including a common valve housing, and, wherein said check valve and said pressure valve each include a spring-loaded valve closure member disposed within said common valve housing.

7. A brake system according to claim 6, wherein said throttle restriction is integrated in said damping means.

8. A brake system according to claim 7, further including a closure member defining said damping chamber and also having a bore receiving said valve housing and, wherein said throttle restriction is arranged as a flow cross-section between said bore in said closure member, and said valve housing.

9. A brake system according to claim 8, wherein said damping chamber is at least partially defined by an elastomeric molded part having a side facing away from said damping chamber and defining at least one cavity.

10. A brake system according to claim 9, wherein said pump includes a pump housing and wherein said damping means is integrated into said pump housing.

11. A brake system according to claim 10, wherein said elastomeric molded part seals said cavity from said damping chamber.

12. A brake system according to claim 11, wherein said cavity is in communication with atmospheric pressure.

13. A brake system according to claim 12, further including a spring element arranged to exert a pressure on said molded elastomeric part tending to resist deflections caused by pressure pulsations in said damping chamber.

14. A brake system according to claim 13, wherein at least one reversal of flow direction is defined between said pump chamber and the outflow from said damping chamber.

15. A brake system according to claim 9, wherein said cavity is formed by at least one of a plurality of recesses in said elastomeric molded part.

16. An antilock brake system including a brake pedal, a master cylinder having a piston stroked by said brake pedal and defining a working chamber, a wheel brake, a brake conduit connecting said working chamber to said wheel brake, a fluid reservoir, a relief conduit connecting said wheel brake to said reservoir, an inlet valve means interposed in said brake conduit and outlet valve means interposed in said relief conduit, pump means having a housing in which are defined a pumping chamber, an inlet in communication with said reservoir and the relief conduit, and an outlet in communication with said brake conduit and master cylinder working chamber;

a damping mans assembly, said damping means assembly comprising:

a closure member defining an interior camping space, said closure member having an open ended generally tubular portion received in and sealed to said pump housing with said open ended portion inc communication with said pumping chamber; a generally cylindrical valve body received within said tubular portion having an inflow passage extending axially through said valve body to said interior damping space of said closure member; a pressure valve mounted in said inflow passage in said valve body in communication with said pumping chamber and opening to allow flow through said in flow passage upon development of a predetermined pressure in said pumping chamber; an outflow passage including an annular space defined between an outside surface said valve body and an inside surface of said tubular portion allowing outflow from said interior damping space of said closure member extending in an axial direction back towards said pressure valve; connection means connecting said outflow passage to said brake conduit and master cylinder working chamber; a throttle restriction formed in said outflow passage; a check valve in said outflow passage mounted in said valve body axially spaced away from said pressure valve, said check valve allowing outflow from said interior damping space to said outflow passage but preventing reverse flow.

17. The brake system according to claim 16 further including an elastic slab member extending across said interior damping space therebetween located spaced from said check valve with an intervening space, a remote space defined in said interior damping space on a side of said elastic member remote from said intervening space and located to allow deflection of said elastic slab member thereinto upon pressurization of said intervening space.

18. The brake system according to claim 17, wherein said closure member is formed with an open end opposite said tubular portion and further includes a cover mounted in said opposite open end and compressing said elastic slab member to create a sealing engagement between said closure member and said elastic slab member.

19. The brake system according to claim 18, wherein said cover is formed with a domed interior contour defining in pat said remote space.

20. The brake system according to claim 19, further including a flat spring extending across said elastic slab member on a side remote from said intervening space and adjacent said remote space resisting deflection of said elastic slab member.

21. The brake system according to claim 20, further including recesses in said elastic slab member adjacent said flat spring.

22. The brake system according to claim 16, wherein said inflow passage includes a radially outwardly inclined axial opening in said valve body extending from the center of said valve body adjacent said pressure valve, and wherein said outflow passage includes a radially outwardly inclined opening in said valve body extending from said check valve.

* * * * *